April 14, 1931.   R. A. ISENBERG   1,800,634
HARROW
Filed March 23, 1929
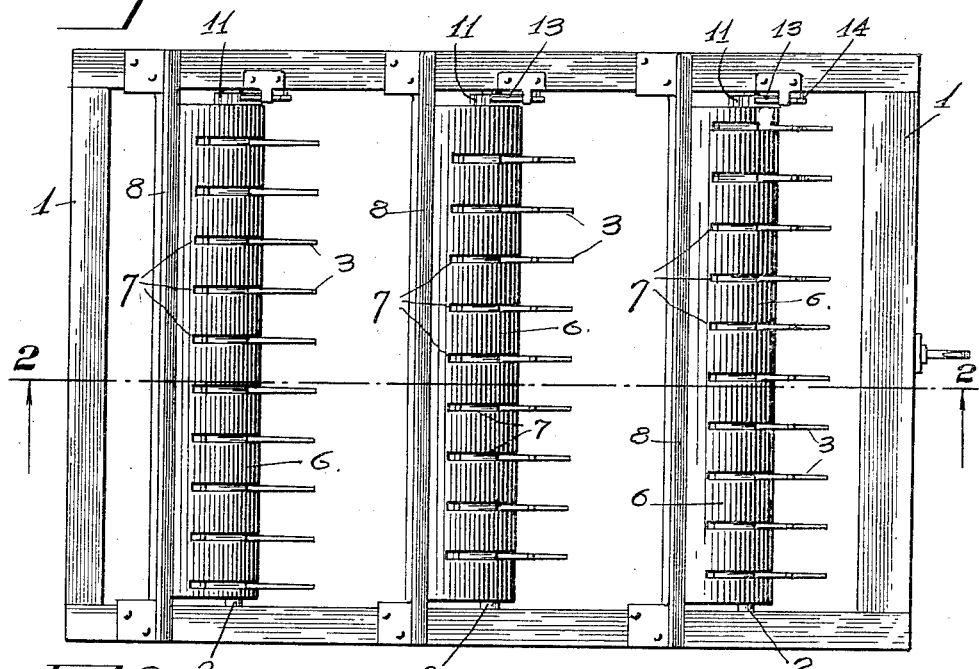
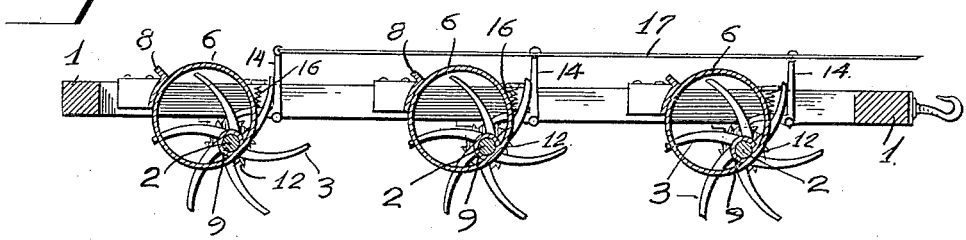
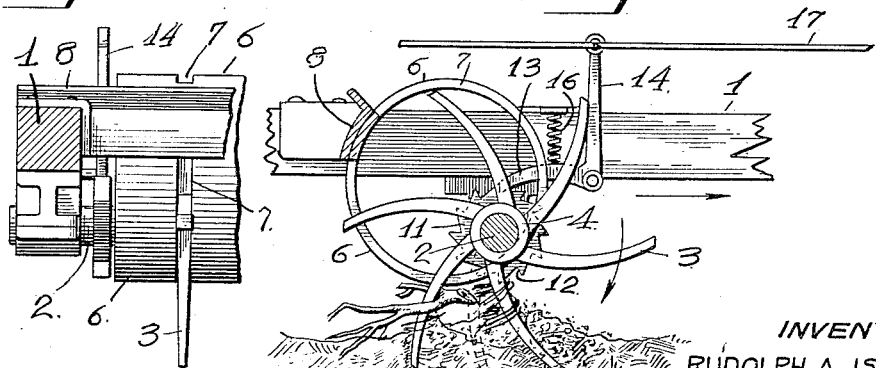
INVENTOR.
RUDOLPH A. ISENBERG.
BY *Arthur L. Slee*
ATTY.

Patented Apr. 14, 1931

1,800,634

UNITED STATES PATENT OFFICE

RUDOLF A. ISENBERG, OF LOS ALTOS, CALIFORNIA

HARROW

Application filed March 23, 1929. Serial No. 349,388.

My invention relates to improvements in harrows wherein a plurality of shafts each provided with a plurality of sets of substantially radial harrow teeth are normally held against rotation as the downwardly disposed teeth are moved over earth to be harrowed, said shafts being releasable to permit the forward movement of said teeth over the earth to rotate the shaft and to move said teeth past stripping means mounted adjacent the shafts, and at the same time to move other teeth into operative downwardly disposed position.

The primary object of my invention is to provide an improved harrow.

Another object is to provide an improved harrow having means for stripping accumulated foreign material from the harrow teeth.

A further object is to provide an improved harrow having means for moving any of a plurality of harrow teeth into operative position.

Another object is to provide an improved device of the character described wherein harrow teeth are mounted upon rotatable shafts adapted to be actuated by the forward movement of the harrow over earth to be harrowed to move any of a plurality of teeth to operative position and to strip foreign material from teeth as the same are moved out of operative position.

A further object is to provide an improved harrow which will permit a clean set of harrow teeth to be shifted to operative position at desired intervals and which will permit a limited regulation of the depth to which said teeth will penetrate into earth being harrowed.

A still further object is to provide an improved device of the character described which is simple and efficient in its operation.

I accomplish these and other objects by means of the improved device disclosed in the drawings forming a part of the present application wherein like characters of reference are used to designate similar parts throughout the specification and drawings, and in which—

Fig. 1 is a plan view of my improved harrow;

Fig. 2 is a longitudinal section taken upon the line 2—2 of Fig. 1 in the direction indicated;

Fig. 3 is a broken sectional detail, drawn upon a larger scale, disclosing the construction and operation of the harrow teeth and stripping means; and Fig. 4 is a broken transverse sectional view showing in rear elevation the members shown in Fig. 3.

Referring to the drawings, the numeral 1 is used to designate in general a suitable frame, preferably rectangular in form and adapted to be dragged over earth to be harrowed.

A plurality of shafts 2 are rotatably mounted transversely of the frame 1. Each shaft 2 is provided with a plurality of spaced sets of harrow teeth 3, said teeth being substantially radially disposed upon hubs 4 keyed or otherwise secured upon the shafts.

Stripping members 6 are mounted upon the frame 1 between the side members thereof. The members 6 are preferably tubular in form and provided with a plurality of slots 7 adapted to permit the teeth 3 to be moved therethrough. The members 6 are arranged eccentrically to the shafts 2 and are preferably supported along their upper sides by flanged cross members 8. The lower forward portions of the members 6 are preferably provided with bearings 9 engaging the shafts 2 whereby the shafts and stripping members are rigidly supported and held in operative relation.

Ratchets 11 are secured upon the shafts 2 adjacent one of the sides of the frame 1 and provided with forwardly faced ratchet teeth 12. Pawls 13 are pivotally mounted upon the adjacent side member of the frame 1 and arranged to engage the adjacent ratchets 11. The pawls 13 are provided with actuating arms 14 and are normally held in operative engagement with their respective ratchets by means of springs 16. An actuating member 17 is connected to the arms 14 of the pawls 13 and extended to a point conveniently accessible to an operator whereby the several pawls may be actuated simultaneously to disengage the ratchets.

In operation, my improved harrow is dragged over earth to be harrowed in the ordinary manner. The pawls 13 are normally held in engaging relation with the ratchets 11 and prevent the rotation of the shafts 2, thereby causing the downwardly disposed teeth 3 to be held in operative position dragging the surface of the earth. The depth to which the teeth penetrate may be regulated to a limited degree by a suitable setting of the shaft whereby the lowermost teeth will be inclined slightly from the vertical, as shown in full lines in Fig. 3, or the lowermost tooth of each set may be disposed in a substantially vertical position to obtain a slightly deeper penetration as indicated in dotted lines in Fig. 3.

As the harrow is moved over the earth to be harrowed, foreign material is gathered and collects upon the operative teeth 3, thereby obstructing the efficient operation of the harrow and reducing the effectiveness of the teeth. When the accumulation of such foreign matter becomes appreciable, the actuating member 17 is moved to operate the pawls and release the ratchets 11 and shafts 2. As the harrow is then moved forwardly, the resistance against the downwardly disposed teeth 3 causes the shafts 2 to be rotated in a clockwise direction, as indicated by the arrows in Fig. 3 of the drawings, thereby causing the clogged teeth to be moved upwardly into the slots 7 of the stripping members 6, and at the same time to move the adjacent clean teeth into operative position. The movement of the teeth 3 into the slots of the stripping members 6 causes the foreign matter to be stripped from said teeth by said member 6.

The ratchets 11 are preferably provided with teeth 12 so arranged that a movement of one tooth will permit a regulation of the depth to which the downwardly disposed teeth penetrate, while a movement of two teeth of the ratchet will cause the next succeeding harrow teeth 3 to be moved to the operative position previously held by the preceding teeth 3. In this manner, a clean set of teeth may be moved to operative position as frequently as necessary by simply holding the pawls 13 out of engagement with the ratchets 11 until a rotation corresponding to the angle of two ratchet teeth 12 has been imparted to the shafts 2. The pressure upon the teeth 3 is such that the ratchets 11 will be held firmly against the pawls to normally prevent rotation of the shafts when the harrow is in use.

The specific construction of the several elements of my invention and the specific number and arrangement of said elements may of course be modified in numerous ways without departing from the spirit of my invention. I therefore do not wish to restrict myself to the specific details as illustrated and described, but desire to avail myself of all modifications which may fall within the scope of the appended claims.

Having thus described my invention what I claim as new and desire to secure by Letters Patent is:—

1. A harrow comprising a frame; a plurality of shafts mounted transversely of the frame; a plurality of hubs mounted in spaced relation along the shafts and each provided with a plurality of harrow teeth; means for normally holding the shafts against rotation; and stripping means mounted adjacent the harrow teeth to strip foreign material therefrom when said teeth are rotated past the stripping means.

2. A harrow comprising a frame; a plurality of shafts mounted transversely of the frame; a plurality of hubs mounted in spaced relation along the shafts and each provided with a plurality of harrow teeth; ratchet means normally holding the shafts against rotation and releasable to permit rotation of the shaft by the harrow teeth engaging the earth being harrowed; and stripping means mounted adjacent the teeth.

3. A harrow comprising a frame; a plurality of shafts mounted transversely of the frame; a plurality of hubs mounted in spaced relation along the shafts and each provided with a plurality of harrow teeth; ratchet means normally holding the shafts against rotation and releasable to permit rotation of the shaft by the harrow teeth engaging the earth being harrowed; and tubular stripping members mounted adjacent the shafts and having slots arranged to permit the movement of the harrow teeth therethrough to strip foreign material from said teeth when the shafts are rotated.

4. A harrow comprising a frame; a plurality of shafts mounted transversely of the frame; a plurality of hubs mounted in spaced relation along the shafts and each provided with a plurality of harrow teeth; ratches secured upon one end of each shaft; pawls mounted adjacent the ratchets and normally holding the shafts against rotation as the downwardly disposed teeth are moved over earth to be harrowed; means for moving said pawls to release the ratchets and shafts whereby said shafts may be turned to move other teeth into operative position; and stripping means mounted adjacent the shafts and adapted to strip foreign material from the teeth when moved therepast.

5. A harrow comprising a frame; a plurality of shafts mounted transversely of the frame; a plurality of hubs mounted in spaced relation along the shafts and each provided with a plurality of harrow teeth; ratchets secured upon one end of each shaft; pawls mounted adjacent the ratchets and normally holding the shafts against rotation as the downwardly disposed teeth are moved over earth to be harrowed; means for moving said pawls to release the ratchets and shafts whereby said shafts may be turned to move other teeth into operative position; and tubular stripping means mounted adjacent the shafts and having slots arranged to permit the movement of the teeth therethrough to strip foreign material from said teeth.

6. In a harrow, the combination with a plurality of shafts each provided with a plurality of sets of radially disposed harrow teeth, of means normally holding the shafts against rotation as the downwardly disposed harrow teeth are moved over earth to be harrowed, said means being releasable to permit the shafts to be rotated by said teeth to move other teeth into operative position; and stripping means mounted adjacent the shafts and adapted to strip foreign material from the teeth when moved therepast.

7. In a harrow, the combination with a plurality of rotatable shafts each provided with a plurality of spaced sets of radially disposed harrow teeth, of ratchet means normally holding the shafts against rotation as the downwardly disposed harrow teeth are moved over earth to be harrowed; means for actuating said ratchet means to release the shafts whereby the movement of the teeth over the earth will rotate said shafts and move other teeth into operative downwardly disposed position; and stripping means mounted adjacent the shafts and adapted to strip foreign material from the teeth when moved therepast.

8. In a harrow, the combination with a plurality of rotatable shafts each provided with a plurality of spaced sets of radially disposed harrow teeth, of a ratchet mounted upon an end of each shaft; a pawl mounted adjacent each ratchet to normally hold the ratchets and shafts against rotation as the downwardly disposed harrow teeth are moved over earth to be harrowed; means engaging the pawls for moving the same simultaneously to release the shafts whereby the movement of said teeth over the earth will rotate said shafts and move other teeth into operative downwardly disposed position; and stripping means mounted adjacent the shafts and adapted to strip foreign material from the teeth when moved therepast.

9. In a harrow, the combination with a plurality of rotatable shafts each provided with a plurality of spaced sets of radially disposed harrow teeth, of a ratchet mounted upon an end of each shaft; a pawl mounted adjacent each ratchet to normally hold the ratchets and shafts against rotation as the downwardly disposed harrow teeth are moved over earth to be harrowed; means engaging the pawls for moving the same simultaneously to release the shafts whereby the movement of said teeth over the earth will rotate said shafts and move other teeth into operative downwardly disposed position; and tubular stripping members mounted in eccentric relation to the shafts and having slots adapted to permit the movement of the teeth therethrough when the shafts are rotated to strip foreign material from said teeth.

In testimony whereof, I hereunto set my signature.

RUDOLF A. ISENBERG.